United States Patent [19]

Hendriks et al.

[11]  4,317,658

[45]  Mar. 2, 1982

[54] APPARATUS FOR THE GASIFICATION OF FUEL

[75] Inventors: Rudolf Hendriks, Velp; Aloysius J. W. Oude Alink, Zevenaar; Berend P. Van Marle, Dieren, all of Netherlands

[73] Assignee: Thomassen Holland B.V., Rheden-De Steeg, Netherlands

[21] Appl. No.: 175,434

[22] Filed: Aug. 5, 1980

[30] Foreign Application Priority Data

Aug. 20, 1979 [NL] Netherlands ......................... 7906303

[51] Int. Cl.³ ............................. C10J 3/42; C10J 3/48
[52] U.S. Cl. ...................................... 48/61; 60/39.35
[58] Field of Search .................... 48/77, 66, 68, 61; 60/39.35, 39.46 S; 431/7; 422/232, 233, 209, 239

[56] References Cited

U.S. PATENT DOCUMENTS

| | | | |
|---|---|---|---|
| 2,185,077 | 12/1939 | Galusha | 48/68 |
| 2,200,066 | 5/1940 | Koller | 48/68 |
| 4,177,636 | 12/1979 | Horgan | 60/39.46 S |
| 4,282,009 | 8/1981 | Belke et al. | 48/61 |

*Primary Examiner*—Peter F. Kratz
*Attorney, Agent, or Firm*—Laurence R. Brown

[57]  ABSTRACT

An apparatus for the preparation of a combustible gas mixture from solid or liquid fuels, consists of a housing, which comprises at least one rotatably disposed, conical basket, a fuel inlet, an inlet for a gasification fluid, an ash outlet and an outlet for the produced combustible gas mixture.

The fuel to be gasified is introduced into the inlet and the apparatus is so operated that a number of revolutions of the basket(s) is maintained such, that the fuel is pressed against said basket which also functions as a supporting grate.

6 Claims, 4 Drawing Figures

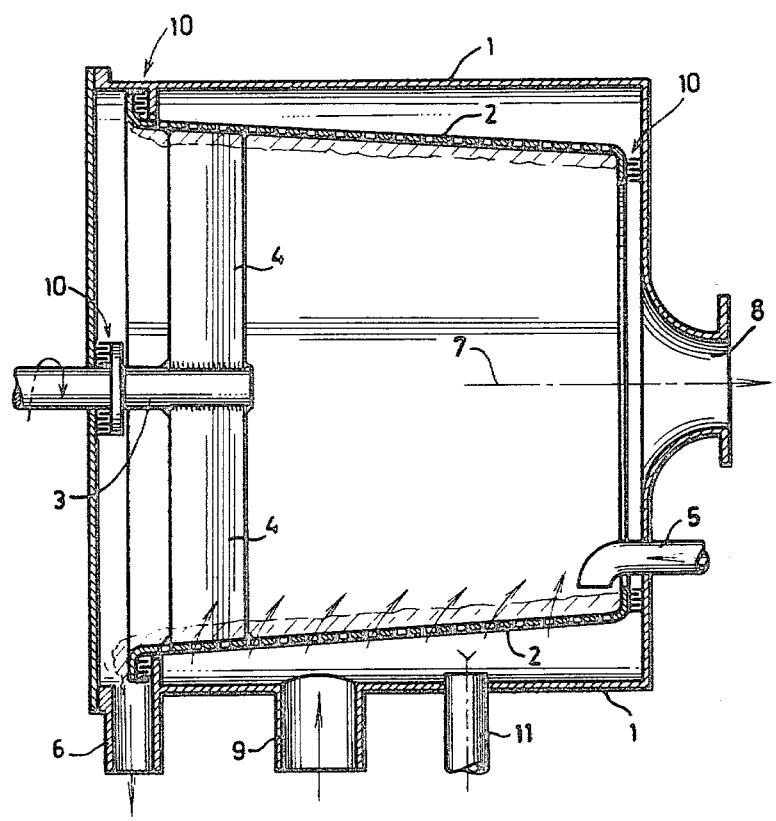
_Fig. 1._

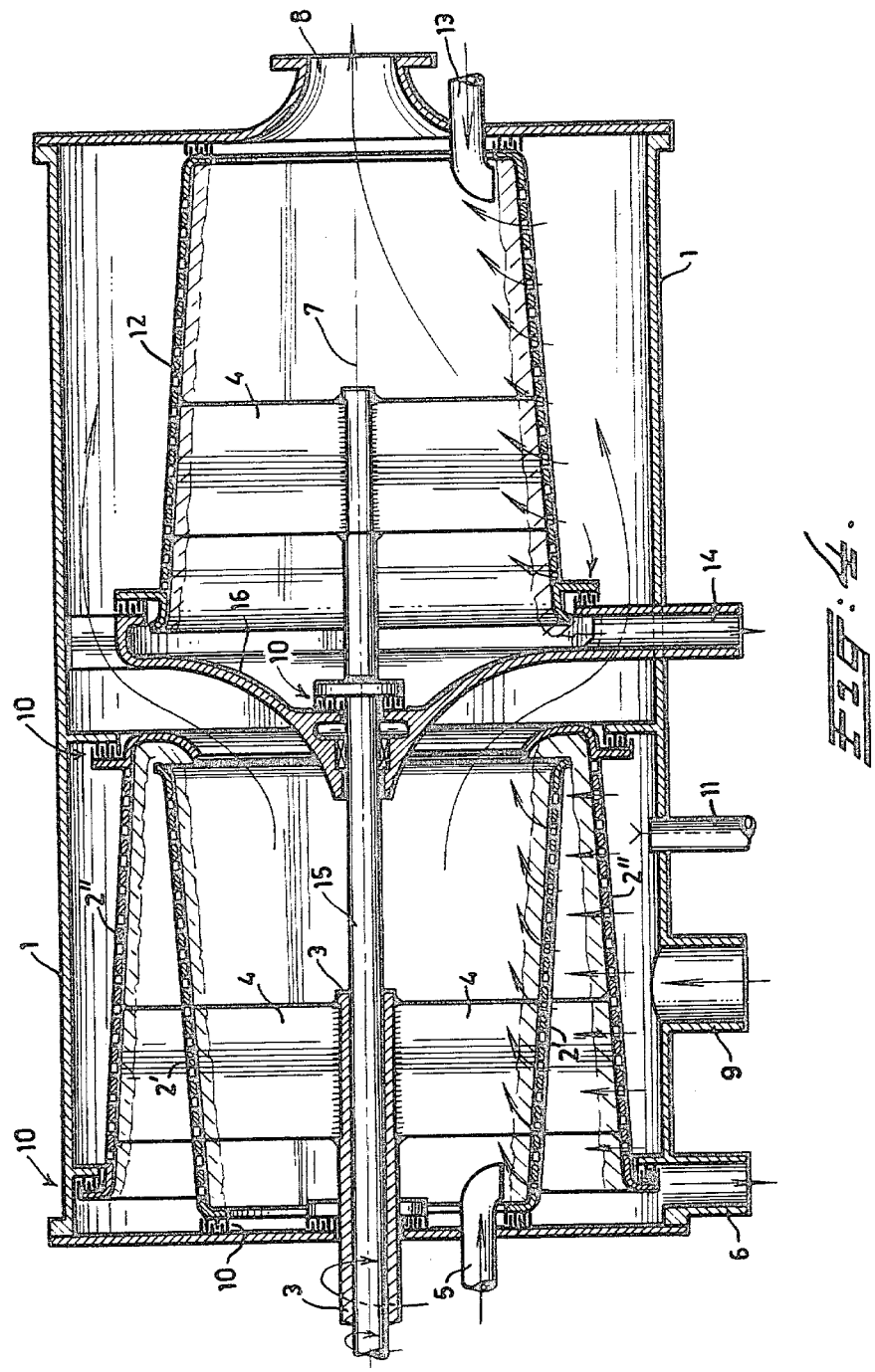

APPARATUS FOR THE GASIFICATION OF FUEL

BACKGROUND OF THE INVENTION

1. Field of the Invention

The present invention relates to apparatus for the preparation of a combustible gas mixture from solid or liquid fuels, such as coal or heavy oils, the apparatus consisting of a treatment housing, provided with an inlet for fuel toward one side of a supporting grate and with an inlet for a gasification fluid along the entire other side of said supporting grate.

2. Description of the Prior Art

Apparatus of this type have been used in the art. The difficulty with said known apparatus is that an automized, uninterrupted procedure for a continuous preparation of a combustible gas mixture, cannot possibly be realized.

SUMMARY OF THE INVENTION

In view of the foregoing factors and conditions of the prior art it is a primary object of the present invention to provide an apparatus having a very simple construction and yet permitting a continuous preparation of a combustible gas mixture by a gasification of both solid and liquid fuels within a very compact space.

This object is attained in accordance with the present invention in that the supporting grate consists at least of one rotatably disposed conical basket, whereby the fuel inlet is located at the end of the basket having the smallest diameter, whereas an ash outlet is accomodated at the end of the basket having the widest diameter, an outlet for the combustible gas mixture being arranged near the axis of the basket(s), whilst during operation such a number of revolutions of the basket(s) is maintained, that the respective fuel is pressed against the supporting grate.

It should be noted that the wording "conical" does not only imply the shape of a straight cone, but also relates to a paraboloid or a hyperboloid and generally to each surface of revolution which at one end has a smaller diameter than at the other end.

Due to a correct selection of the angle of inclination of the number of revolutions of the basket(s) and of the air velocity, a movement of solid fuel particles or of fluid fuel may be obtained from one basket end toward the other, so that a continuous supply of fuel and a continuous discharge of ash causes a continuous preparation of a combustible gas mixture to be obtained, which mixture may be used at once. The latter is very important since the produced combustible gas mixture will have a high temperature so that a caloric loss is avoided when said mixture is used instantaneously.

The apparatus in accordance with the present invention, is further very effective in that simultaneously with the ash, a plurality of harmful pollutions (so-called contaminants) are discharged, which may be an improtant factor when gasifying heavy oils. The gas mixture obtained may be employed for feeding a gas turbine or a gas engine, but it is also possible to use said gas mixture for gas vessels and in general for all kinds of caloric devices. The apparatus according to the invention specifically differs from known apparatus in that within a very reduced space a high density of energy is obtained.

In a preferred embodiment of the present apparatus the conical basket consists of at least two co-axial parts, which both form equal treatment steps of the preparation, the gasification fluid being introduced during the last step and being subsequently transmitted toward the preceding steps. An embodiment of this type allows a separation between the two most important steps of the gasification procedure, to wit between degasing the fuel and the gasification, that is to say the conversion into CO. The gasification fluid (mostly air) is then introduced during the second step and is so heated that the gas mixture obtained may be employed for the first step, i.e. the degasification.

The co-axial parts of the rotatable basket are preferably concentrically arranged within one another, the conical shape of subsequent parts of the basket(s) being opposed, so that the fuel passes a zig-zag-shaped path within the treatment housing. An embodiment of this type limits the length of the apparatus and permits a very compact construction. All parts of the basket(s) need not necessarily be driven with the same velocity, as one or more co-axial parts of the conical basket(s) may be provided with drive means, which exert a rotational velocity differing from that of the other basket parts. The latter is essential on determining the required centrifugal force, the traveling velocity of the fuel along the basket, and so on.

As contaminants from the fuel may possibly be entrained in the gas mixture, a favorable embodiment of the apparatus in accordance with the present invention, comprises a sieve for the removal of said contaminants from the gas mixture, said sieve being disposed inbetween the outlet of the combustible gas mixture and the rotatable basket for fuel to be gasified.

In the present case the wording contaminants is to be understood as those substances which both in a solid form (e.g. ash particles) or in a gaseous form, may impair tools (e.g. $Va_2O_5$) or which are not desirable with respect to environmental requirements (for example $H_2S$).

The sieve is preferably a conical auxiliary basket, being accomodated co-axially with respect to the rotatable basket(s) and comprises an inlet of absorbing material of its small extremity and an outlet at its wide extremity beng disposed at that point of the housing which faces the ash outlet.

The features of the present invention which are believed to be novel are set forth with particularity in the appended claims.

Other claims and many of the attendant advantages will be more readily appreciated as the same becomes better understood by reference to the following detailed description and considered in connection with the accompanying drawings in which like reference symbols designate like parts throughout the figures.

DESCRIPTION OF THE DRAWINGS

FIG. 1 is an axial cross-section through a first embodiment, comprising a conical basket consisting of one single part;

FIG. 3 is still another embodiment wherein an auxiliary basket is employed for carrying an absorbent, which basket is accomodated within the other main basket parts;

FIG. 4 is an embodiment according to FIG. 3, wherein the auxiliary basket is disposed co-axially in the extension of the other basket parts.

DESCRIPTION OF PREFERRED EMBODIMENTS

Figure 2:
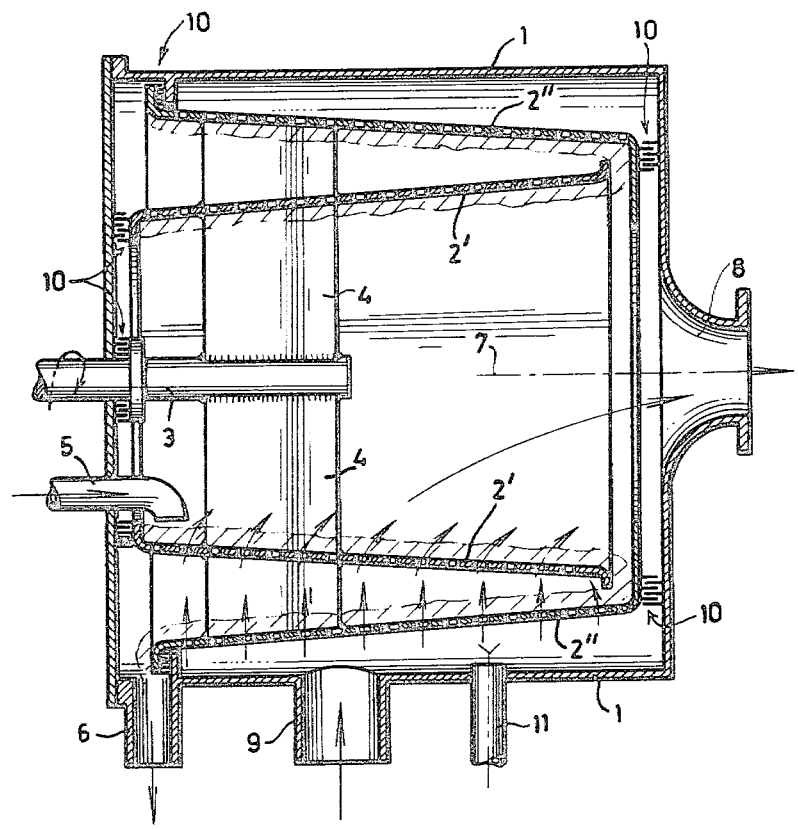
FIG. 2 is another embodiment, wherein the basket is built up from two concentric parts.
Figure 5:
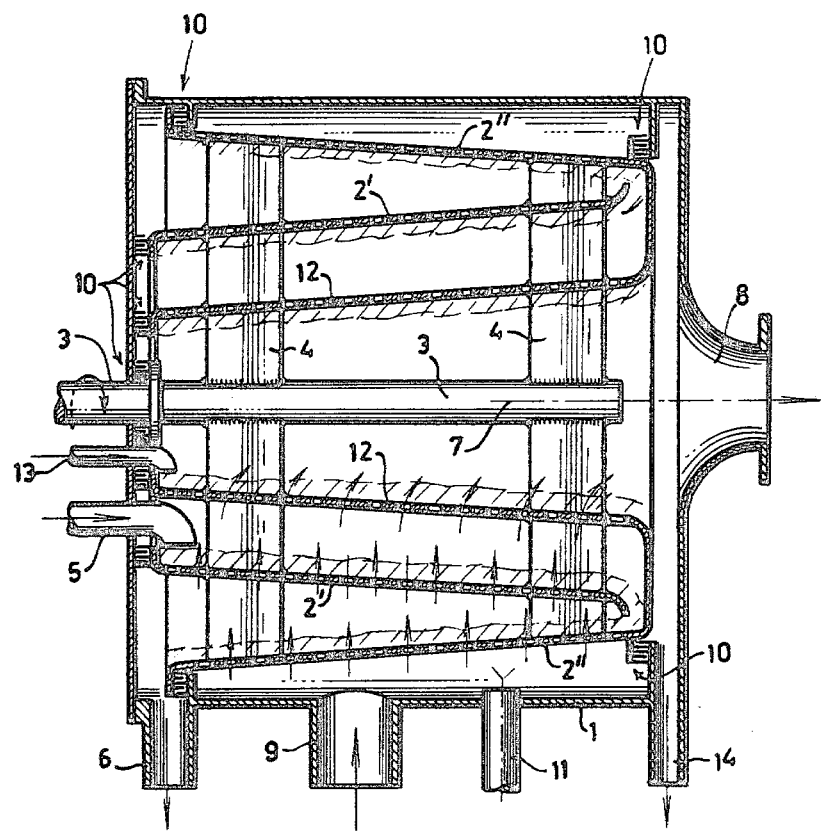

In order to best understand the present invention a description of preferred embodiments thereof is provided accompanied by drawings. FIG. 1 shows the most simple embodiment of the apparatus for the gasification of fuel in accordance with the present invention. Said apparatus consists of a housing 1 in the interior of which a supporting grate 2 is accomodated. Said supporting grate is formed by a rotatable conical basket having a central shaft 3, which supports basket 2 through some supporting strips 4. The housing 1 is further provided with an inlet 5 for fuel which may consist of solid particles (coal) or of liquid material (for example heavy oils). Said inlet 5 is located at the end of the basket having the smallest diameter, shown at the right-hand side of FIG. 1. The basket end having the largest diameter comprises an ash outlet 6, whilst near the centre line of basket 2 a gas outlet 8 is located. The wall of housing 1 comprises an inlet 9 for gasification fluid (mostly air) being so disposed that said air may enter along the entire outer face of the grate or basket 2.

As the housing 1 is stationary, whilst basket 2 with shaft 3 rotates during operation, seals 10 are disposed between housing 1 on the one hand and the extremities of basket 2 on the other hand, as well as at the passage for shaft 3. Housing 1 further comprises a so-called ignition burner 11 by means of which the entire gasification procedure may be initiated. The gasification apparatus in accordance with FIG. 1 may operate continuously, the fuel in that case being regularly supplied via inlet 5, whereafter said fuel is moved along the inner wall of basket 2, toward outlet 6 in a gradual way, the procedure occurring under the influence of the component of the centrifugal force directed toward the left (in FIG. 1) and the inwardly directed pressurizing force, which is exerted by the gasification medium flowing into basket 2 through the respective openings. The gradually produced ash is discharged from the housing 1 via outlet 6 whilst a continuous flow of a combustible gas mixture will be discharged through outlet 8. Said gas mixture may be employed directly in a caloric device (not shown) such as a gas turbine, a gas engine or a steam vessel.

Referring now to FIG. 2 the conical basket 2 consists of two coaxial parts 2' and 2". Said parts are disposed concentrically within each other, the conical shape of the successive parts 2' and 2" being opposed, thus causing the fuel to pass a zig-zag-shaped path within the housing. Said embodiment of the basket in two parts causes two treatment steps to be obtained, the fuel being degased upon the innermost part 2' of the basket 2 and gasified upon the outermost part 2". In this case, the gasification fluid will first pass the last step of gasifying so that its highly increased temperature will cause a degasification to occur in the freshly supplied fuel upon basket part 2'.

Although the apparatus according to the present invention offers the advantage that certain contaminants in the fuel will be discharged from the housing 1 through ash outlet 6, the embodiment of FIG. 3 comprises an additional provision, by means of which the combustible gas mixture obtained may be purified. To that end a sieve 12 is accomodated between outlet 8 of the combustible gas mixture and the rotatable basket 2, for fuel to be gasified. Said sieve is a conical auxiliary basket disposed concentrically with respect to the rotatable baskets 2' and 2", and comprises an inlet 13 of absorbing material. The conical shape of the auxiliary basket 12 is such, that its small extremity is positioned at that side of the housing where the fuel inlet is located. Subsequently outlet 14 of used absorbing material may be disposed at the opposite side of housing 1, to wit at the opposite side with respect to the ash outlet 6.

In the embodiment of FIG. 3 the auxiliary basket 12 is connected with the outermost basket part 2" and the shaft 3 within housing 1 is extended in order to apply additional supporting strips 4. It should be noted, however, that one or more of the three conical parts of baskets 12 and 12 being disposed concentrically within each other, may be provided with separate drive mechanisms by means of which a rotational velocity may be exerted which differs from that in the other basket parts. This may be essential when the flow velocity or the residence time of the material being supported by the respective baskets, should be influenced, which influence may, however, also be obtained by using a conical shape, differing from the shown straight cone. A differing conical shape is for instance a truncated paraboloid or a hyperboloid, one extremity of a basket shaped in that manner, having a diameter smaller than the other extremity.

Referring now to FIG. 4 a variant of the embodiment of the gasifying apparatus of FIG. 3 is shown, wherein housing 1 has a large length, whereas auxiliary basket 12 is located co-axially in the extension of basket 2. To that end shaft 3 comprises a second shaft 15, the center of said shaft being supported by a curved bush (hub) 16 by means of which a smooth transition is obtained between the space at the left-hand side of said bush or hub and the space at the other side. In the latter embodiment an equal rotational velocity of shafts 3 and 15 will cause a centrifugal force to occur in the auxiliary basket 12, exceeding that in the embodiment of the auxiliary basket in FIG. 3. The presence of two shafts offers the possibility to exert various rotational velocities, as described hereinbefore.

What is claimed is:

1. Apparatus for the preparation of a combustible gas mixture from solid or liquid fuels, such as coal or heavy oils, comprising a stationary treatment housing including therein a substantially conically shaped perforated grate rotatably mounted about a substantilly horizontal axis, provided with means defining an inlet for fuel toward one side of said grate and means defining an inlet for a gasification fluid along the entire other side of said grate, wherein the grate consists of at least one basekt shaped grate with two substantially axially positioned open ends on the opposite sides and the fuel inlet means is located near the open end of the grate having the smallest diameter to dispose fuel on the grate, means defining an ash outlet being accomodated at the end of the basket having the widest diameter to dispose ashes from said grate, means defining an outlet for the combustible gas mixture being arranged at the small end near the axis of the grate, whilst during operation rotation of the grate is maintained, and drive means for rotating the basket at a speed such that the fuel is pressed against the supporting grate.

2. Apparatus for the preparation of a combustible gas mixture from solid or liquid fuels, according to claim 1, wherein the conical grate consists at least of two coaxial parts for receiving fuel, degassing the fuel and then gassing it, and means for introducing in one grate gasification fluid for transmission toward the fuel being gasified in both grates 3. Apparatus for the preparation of a combustible gas mixture from solid or liquid fuels, according to claim 2, wherein the co-axial parts of the rotatable grate are disposed concentrically within each other, the conical shape of successive parts of the grate being disposed in opposite directions, with a fuel inlet causing the fuel to pass a zig-zag-shaped path within the housing successively from the inner grate to the outer grate.

4. Apparatus for the preparation of a combustible gas mixture from solid or liquid fuels according to claim 2, wherein one or more co-axial parts of the conical grate are provided with different drive mechanisms providing different rotational velocities.

5. Apparatus for the preparation of a combustible gas mixture from solid or liquid fuels according to claim 1, wherein a sieve is disposed between the outlet of the combustible gas mixture and the rotatable grate, for fuel to be gasified for removing contaminants from the gas mixture.

6. Apparatus for the preparation of a combustible gas mixture from solid or liquid fuels according to claim 5, wherein the sieve is a conical auxiliary basket like member, being located co-axially with respect to the rotatable grate, said auxiliary basket member comprising an inlet for absorbing material disposed at the small extremity of the auxiliary basket member and an outlet for absorbed material located at the wide extremity of the auxiliary basket member, disposed at that side of the housing facing the ash outlet.

* * * * *